June 23, 1931.  B. V. NORDBERG  1,811,020
REVERSIBLE ROLLING MILL ENGINE
Filed May 21, 1925   8 Sheets-Sheet 1

Inventor
Bruno V. Nordberg
Deceased
Helena C. Nordberg
Executrix
By
Attorneys.

Fig.3.

June 23, 1931.    B. V. NORDBERG    1,811,020
REVERSIBLE ROLLING MILL ENGINE
Filed May 21, 1925    8 Sheets-Sheet 4

June 23, 1931.   B. V. NORDBERG   1,811,020
REVERSIBLE ROLLING MILL ENGINE
Filed May 21, 1925   8 Sheets-Sheet 5

Inventor
Bruno V. Nordberg
Deceased
Helena C. Nordberg
Executrix,
By
Attorneys.

Patented June 23, 1931

1,811,020

UNITED STATES PATENT OFFICE

BRUNO V. NORDBERG, DECEASED, LATE OF MILWAUKEE, WISCONSIN, BY HELENA C. NORDBERG, EXECUTRIX, OF MILWAUKEE, WISCONSIN

REVERSIBLE ROLLING MILL ENGINE

Application filed May 21, 1925. Serial No. 31,954.

This invention relates to steam engines and particularly to reversible engines for rolling mill duty.

So far as applicant is advised, no one has heretofore produced a reversible engine for rolling mill service using high initial pressure and a high ratio of expansion. The present invention produces an engine of such type which is now in successful operation, and which, as a result of high pressure, superheat, and expansion, is giving good steam economy. Furthermore, this engine is controlled directly by manipulation of the reversing gear and has no regulation by throttle such as has been the universal practice in rolling mill engines heretofore.

Many of the features of this new engine, individually considered, are not new in other relations. These elements are, however, combined in a new relation to produce the desired result, and certain of them are modified to give them new and heretofore undesired characteristics, adapting them to this particular field of use. In order that the importance of these various adaptations and modifications of detail may be fully appreciated, it is desirable first to outline the requirements of the service and the manner in which these have heretofore been met. In this way the important considerations controlling the design of an engine constructed according to the present invention may be made clearer than is otherwise possible.

In the operation of two-high rolling mills it is necessary to reverse the rolls and consequently to reverse the engine. This reversal must be quickly effected, and that fact, as well as the necessity of quick stopping and starting, precludes the use of fly wheels. In fact, the ideal reversible rolling mill engine has the minimum possible momentum in proportion to the power which it develops. This means that the entire torque must at all times be developed by the engine without assistance from the momentum of moving masses. The engine must be capable of starting and running smoothly before the billet enters the roll. It must develop immediately an increase of power as the piece enters, and must then continue to operate at the proper speed until the pass is completed. As the work leaves the rolls, the development of power must be suddenly checked so that the engine will not race. Moreover, it is sometimes necessary to reverse or to start under full load, and this means that the cylinders must develop ample power in the worst possible crank position.

The customary solution of this problem is to use two double-acting cylinders with the cranks set quartering. Such an engine is ordinarily equipped with slide valves of either the flat or piston type, and the cut-off is ordinarily at about 90% of the stroke. Slide valves give large cylinder clearances and long cut-offs preclude economical steam expansion, so these two factors combine to produce gross waste. A consideration of the crank effort diagram of any two-cylinder, double-acting reversible rolling mill engine, with the cranks at 90°, shows that the crank effort tends to be very irregular. Accordingly, in order to secure relatively smooth operation (in the absence of the regulative effect of a fly wheel) it is necessary to throttle the inlet steam.

The combined effect of a long cut-off, large clearance spaces and throttled inlet is necessarily very poor efficiency, and it is a fact notorious in the art that reversible rolling mill engines are among the least economical steam prime movers now in use. Nevertheless, engines of this type of extremely large power are extensively used in the steel industry.

It follows that the production of an economical reversible engine of this type which will meet the severe requirements of rolling mill service is a matter of considerable economic importance.

It is obvious that, if an engine is to operate smoothly without a fly wheel and without throttling regulation at relatively short cut-offs, it must have a relatively large number of cylinders, and almost the first consideration in the development of an engine of this type is to determine how many cylinders shall be used. On this will turn a number of important details affecting the type of cylinder and the nature of the steam valves and the valve-actuating gear.

The controlling factor in the size of the engine, i. e., the total cylinder volume, is the ratio of the minimum crank effort to the average, for as has been stated, the engine must be able to start under full load with the cranks in the most unfavorable position. The first step is to lay out a diagram showing the starting crank effort. Such a diagram must ignore all the efforts produced by each cylinder beyond its point of longest cut-off, for in starting only those cylinders which have not yet reached such point of cut-off are effective. The following table gives the resulting values for engines having, two, three, four and five cranks, the cranks being assumed to be so arranged that the dead center positions of the pistons are spaced equally in a revolution.

| Point of cut-off | Ratio {Minimum starting effort / Average starting effort} | | | |
|---|---|---|---|---|
| | 2 cranks | 3 cranks | 4 cranks | 5 cranks |
| 0.90 | 0.58 | 0.81 | 0.79 | 0.83 |
| 0.80 | 0.43 | 0.55 | 0.70 | 0.78 |
| 0.70 | 0.30 | 0.48 | 0.62 | 0.70 |
| 0.60 | 0.16 | 0.44 | 0.55 | 0.65 |
| 0.50 | 0. | 0.38 | 0.44 | 0.55 |
| 0.40 | | 0.27 | 0.39 | 0.40 |
| 0.30 | | 0.057 | 0.30 | 0.35 |

The data for two cranks shows clearly why approximately 90% cut-off is customary with such engines, and why shorter than 80% cut-off is not used. The table shows that four engines of approximately the same total cylinder volumes, but differing in the number of cylinders, will have approximately the same starting effort with the following cut-offs:

Two crank engine, 90%.
Three crank engine, 80%.
Four crank engine, 60%.
Five crank engine, 50%.

It follows that the three cylinder engine has no great advantage over the twin, while the four cylinder engine has a very great advantage. The economy gained by the adoption of five cylinders is ordinarily not sufficient to justify the extra complication, and it is believed that for usual service the four cylinder arrangement with variable cut-off and maximum cut-off at 5/8 stroke will prove a satisfactory standard.

It is important to note that the above figures are based on equal spacing of dead centers, and this means that, in a four cylinder engine, there will be two units, each consisting of two cylinders set quartering, the two units being displaced 45° from each other. This crank arrangement, while not broadly new, is believed to be new as applied to a reversible engine having no fly wheel.

Having arrived at the conclusion that four or more cylinders are desirable, the next question is as to the type of cylinder. It is highly important to reduce clearance in the cylinder and the conventional types of exhaust valve are the greatest sources of such clearance. This suggests the desirability of using the so-called uniflow or terminal exhaust type of cylinder. This type is well adapted to large power units, and has been adopted for use in the present engine. Beside the reduction of clearance which it permits, it has the additional advantage of requiring no reversing gear for actuating exhaust valves. Such gear, because of the large size of the valves and the power necessary to actuate them, would be cumbersome and would greatly complicate the maneuvering of the engine.

Since the piston in a uniflow engine alone controls the exhaust, and since a rolling mill engine must stop, start, and reverse in every position of the pistons, some means must be provided to unload the cylinders at the time of starting and reversal, as otherwise the confined steam would render maneuvering impossible. This unloading must occur automatically as an incident to starting the engine in either direction. Generally stated, this problem is solved by actuating the inlet valves by a reversing valve gear which has a greater travel in full gear position both forward and reverse than it has in intermediate positions. This greater travel in these two extreme positions is used to actuate unloading valves associated with the inlet valves.

A number of reversing valve gears having this characteristic of increased motion are known, and the selection of any particular type of gear is affected by considerations which are dependent on the particular type of valve used. There is illustrated in the present application, a poppet valve mechanism of the equilibrium type actuated through a known cam mechanism by a modified form of Marshall valve gear, the modification giving increased lead toward full gear positions instead of constant lead as is usual.

The purpose of giving the variable lead characteristic is to insure that the inlet valves will all be closed in mid-gear position so that this becomes a neutral position and consequently this is hereinafter referred to as "neutral". Similarly the full gear positions as maximum positions are designated turning "over" and "under" to avoid any implication that the engine has any normal direction of rotation.

The modification of the Marshall gear to give variable lead preferably consists in a change in the length of the radius rod, so that the arc which its swinging end describes does not pass through the axis of the arc along which its pivoted end is adjusted to set the valve gear. The link may be either shorter or longer than the radius of the arc or quadrant, but a quadrant whose radius exceeds the length of the radius rod is preferred and hence illustrated.

This characteristic of variable lead precludes the use of a single eccentric and valve gear for both ends of a cylinder, as one end would be given excessive lead. Hence there are used for each cylinder two eccentrics set at 180° from each other, two eccentric straps and two radius rods. The radius rods of each pair are carried by a single quadrant yoke. Thus each inlet valve has a corresponding inlet valve gear.

Since the crank shaft is large in rolling mill engines, it is impracticable to put the valve actuating eccentrics in it, and a lay shaft is desirable to permit the use of small eccentrics and a correspondingly compact valve gear. This lay shaft is necessarily parallel with the crank shaft and must be driven in absolute unison with the crank shaft. All back lash or lost motion must be eliminated in a reversible engine, as reversal precludes any compensatory setting of the eccentrics. This excludes all gear trains. Two parallel rods set quartering are better, but not satisfactory, as the rods act alternately in tension and compression so that the effects of worn journals are additive or cumulative. Hence the expedient of using an odd number of cranks equally spaced in each shaft and a corresponding number of parallel rods, each of which always acts in compression has been adopted. Three is the theoretical minimum, but in practice three develops excessive friction at certain crank angles. Five cranks is a satisfactory standard and is preferred.

As an incidental feature there is combined with the valve controlling gear a throttle valve and mechanism for closing the throttle when the valve controlling gear is in neutral position. This is merely a safety device to provide secondary stopping means in case of failure or wrong adjustment of the valve gear. The throttle preferably has no regulative effect on the engine when running.

The preferred embodiment of the invention is illustrated in the accompanying drawings, in which:—

Figure 1:
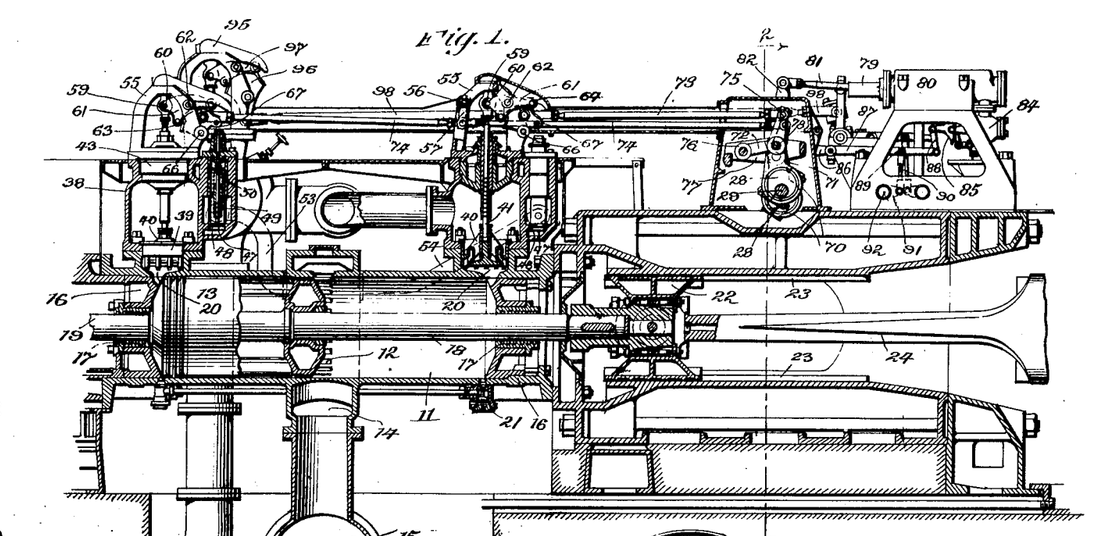
Fig. 1 is a longitudinal axial section through one cylinder and its inlet valve gear. The relation of the plane of section to the inlet and unloading valves is indicated by the line 1—1 in Fig. 5.

The engine illustrated is provided with four identical cylinders, one of which is illustrated in detail at 11 in Fig. 1. This cylinder is of the terminal exhaust or uniflow type having central exhaust ports 12 controlled by the elongated piston 13. The exhaust ports 12 lead by way of branch ports 14 to the main exhaust line 15.

The cylinder 11 has the heads 16 provided with packing glands 17 to seal the joint with the piston rod 18 and tail rod 19. These parts are of ordinary construction as are the inlet steam ports 20 and the cylinder drain cocks 21, crosshead 22, crosshead guides 23 and connecting rod 24.

Figure 2:
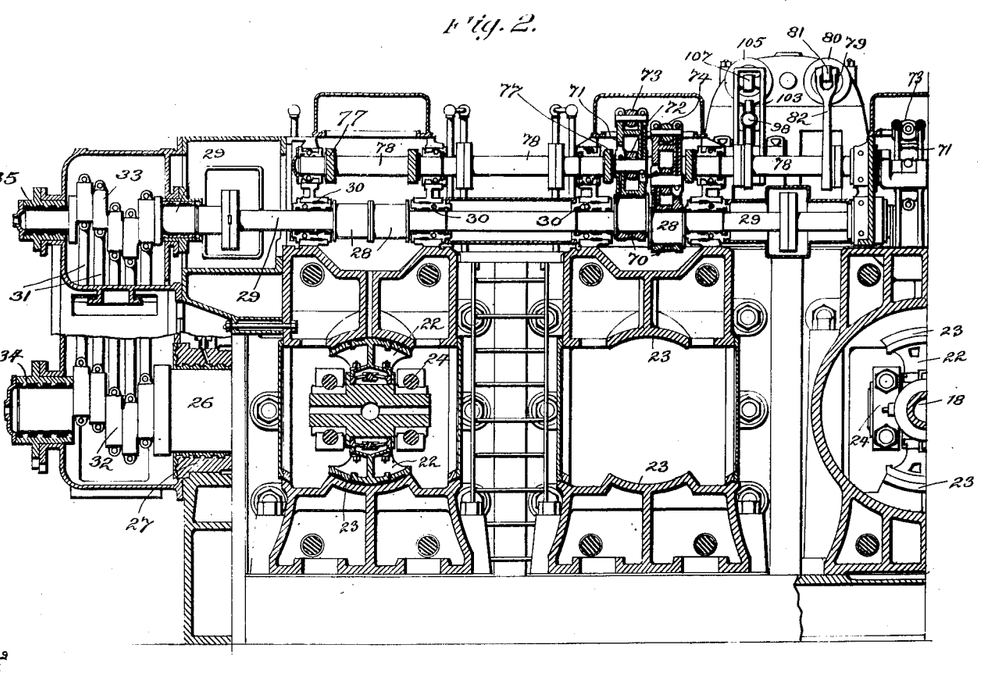
Fig. 2 is a transverse section through a portion of the engine on the line 2—2 of Fig. 1.
Figures 7, 8:
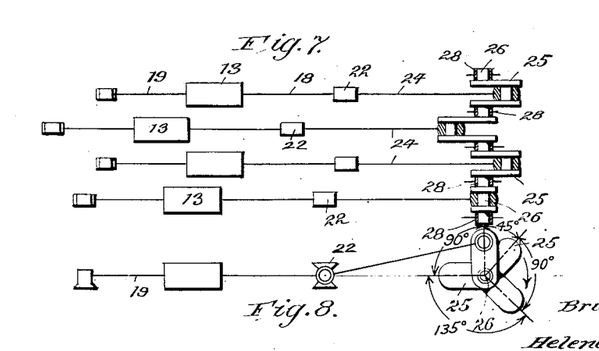
Figs. 7 and 8 are respectively plan and elevation diagrams showing the preferred crank arrangement for a four cylinder double acting engine.

Each connecting rod 24 is connected to a corresponding crank 25 on crank shaft 26 running in main bearings 27. The shaft 26 is shown in Fig. 2, while the angular arrangement of the cranks is illustrated diagrammatically in Figs. 7 and 8. In the preferred arrangement the spacing is 90°, 45°, 90°, 135°, because a desirable balancing characteristic is thus secured. From the last named figures it will be observed that the eight dead points for the four double-acting cylinders are equally spaced in a rotation of the crank shaft, this being an important factor in securing satisfactory starting and reversing.

Since the shaft 26 is large and is inconveniently located it is desirable to place the valve-actuating eccentrics 28 on a lay shaft 29 driven in the same direction and at equal speed by the crank shaft. The shaft 29 turns in a series of aligned bearings 30 and is driven by a series of parallel rods 31, five being shown and preferred, each rod connecting a corresponding pair of eccentrics 32 and 33 placed respectively in the crank shaft 26 and on the lay shaft 29. Outboard bearings 34 and 35 are provided to steady each group of five eccentrics 32 and 33 respectively, and the eccentrics of each group are spaced at uniform angular intervals and all have the same eccentricity. As explained this connection ensures accurate transmission of rotary motion from the crank shaft to the lay shaft in both directions, and without any lost motion at reversal.

Figure 3:
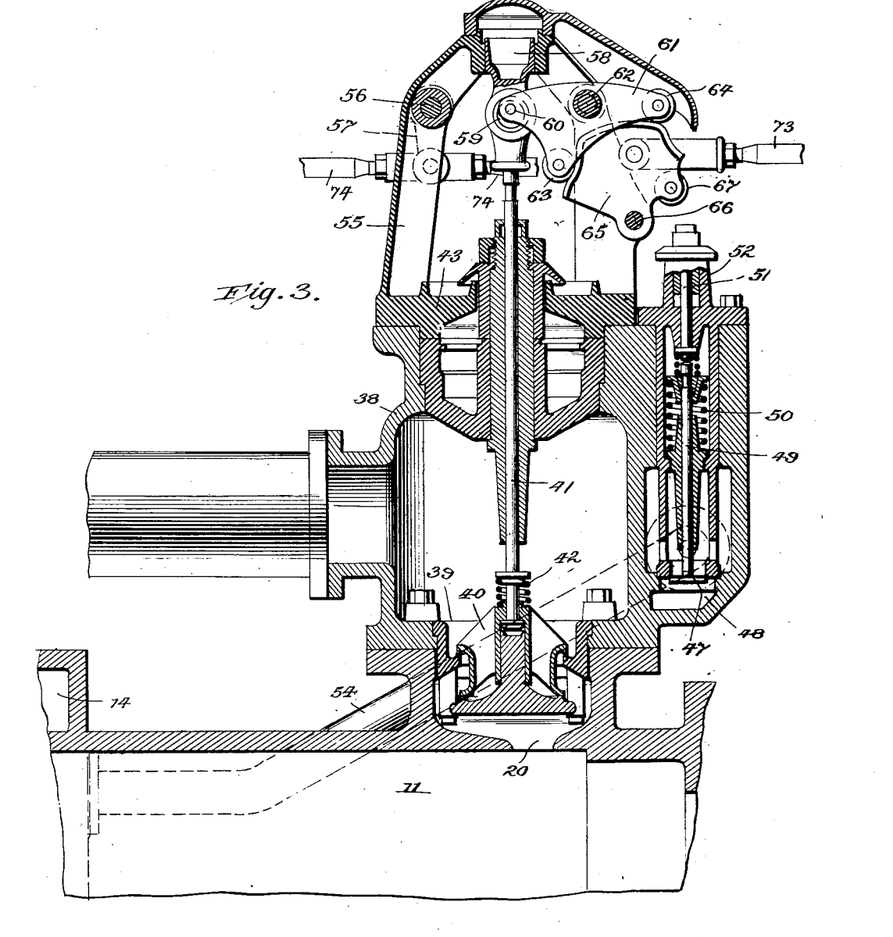
Fig. 3 is a fragmentary view showing a portion of Fig. 1 enlarged to show the details of the inlet and unloading valves with the actuating mechanism therefor.
Figures 5, 6:
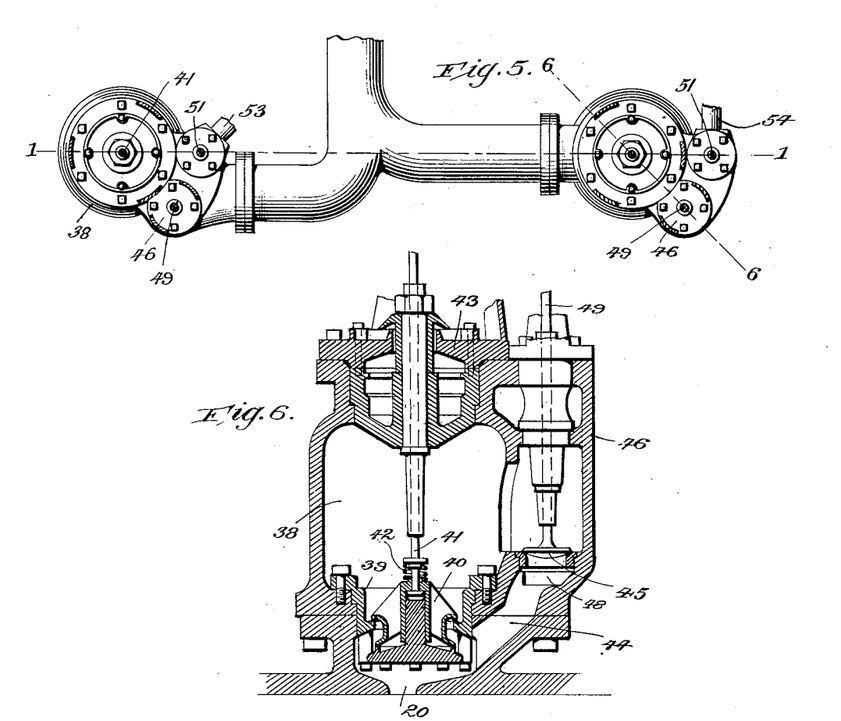
Fig. 5 is a fragmentary plan view showing the relative locations of the inlet, unloading and relief valves.
Fig. 6 is a section on the line 6—6 of Fig. 5 showing an inlet valve and its associated relief valve.

The steam inlet valves are shown in Figs. 1, 3, and 6 and are balanced double beat poppet valves with quick motion cam actuation designed to permit over-travel of the actuating cam in valve-open and valve-closed positions. This valve and the actuating cam mechanism are known but because of its quick opening and closing characteristics and the possibility of over-travel of the actuating gear, the combination is eminently suitable to the purpose.

The steam chests are shown generally at 38, the valve cage at 39 and the valve at 40. The valve 40 is actuated by reciprocating valve stem 41 with lost motion spring connection 42 which ensures a moderate yielding seating pressure on the valve when closed. The stem 41 passes through the bonnet 43, the usual sealed joint being afforded. The space below the cage 39 communicates directly with the steam port 20 leading to the cylinder, and a by-pass port 44 leads past valve 40 to the space within chest 38 above valve 40. A relief valve 45 normally held closed by pressure in chest 38 obstructs port 44. It opens automatically when cylinder pressure exceeds main steam pressure as it might do in case of accident or maladjustment of the valve gear. Valve 45 is purely a safety device and normally remains closed. The position of valve 45 is indicated on Fig. 6 by the enlargement 46 formed on the side of the steam chest 38 to receive it.

In additon to the relief valve just described, there is an unloading valve associated with each steam chest and inlet valve. This valve is designed to be opened by the actuating mechanism of each inlet valve while the inlet valve is closed, when the valve gear is set in its maximum position either turning over, or turning under, but not otherwise. This vents the confined steam from the working spaces and allows the engine to start without opposition therefrom. The action is secured by the excess travel of the valve actuating mechanism when the valve gear is in the two extreme settings.

The unloading valves are shown in Figs. 1 and 3 as single-beat poppet valves 47 which open inward (toward the cylinder) into ports 48 which communicate with the steam inlet ports 20 by way of ports 44 (see Figs. 3 and 6). They are provided with stems 49 which project upward through guides, and they are urged upward in closing direction each by a spring 50. A tappet 51 is guided and sealed in the bonnet 52. The lower end of the tappet 51 abuts against valve stem 49 and the upper end is actuated by a roller on the inlet-valve actuating-cam, later to be described, when the latter moves through its extreme range. The spaces above valves 47 are connected to the exhaust port 14 through pipe connections 53 (for valves at the head end) and 54 (for valves at the crank end).

Figure 4:
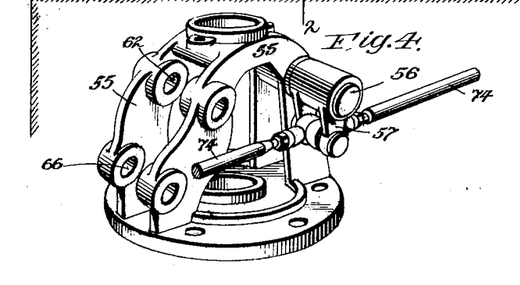
Fig. 4 is a perspective view showing a crank end inlet valve bonnet and indicating how the reach rod to the head end inlet valve is supported and guided.

Mounted on each steam chest 38 is a frame 55 which carries the valve actuating mechanism. One such frame 55 is shown in Fig. 4 in detail. This view shows the frame used at the crank end, but the head end frame is identical except that it lacks the trunnion 56. This trunnion 56 is used on the crank end frame to carry the swinging arm 57 which guides the reach rods, hereinafter described, for driving the actuating cam of the head end inlet valve. The head end and crank end actuating mechanisms are identical but are actuated individually by separate eccentrics and straps.

Vertically guided in the top of each frame 55 is a plunger 58 which is connected to the corresponding inlet valve stem 41. A cylindrical pin 59 is journaled in plunger 58 and eccentrically pinned thereto at 60 is the cam follower 61 which is itself pivoted in frame 55 at 62. The follower 61 carries two rollers 63 and 64 positioned on opposite sides of pivot 62 and contacting with the periphery of actuating cam 65 which is itself pivoted at 66. The cam 65 is so formed that as it swings alternately back and forth through a relatively small angle it imparts sudden positive movements in alternate directions to cam follower 61. The follower 61 through the connections described opens and closes the inlet valve 40.

The cam 65 is so formed that it may have considerable over-travel while the valve remains open and while it remains closed and this property permits a variable timing of the cut-off by varying the action of the valve actuating eccentrics as is hereinafter described. The over-travel in valve-closed condition is also availed of to actuate the unloading valve by placing a roller 67 on the cam 65 in position to strike tappet 51 and open valve 47 when the cam has its extreme over-travel in inlet-valve-closed condition.

The valve actuating eccentrics 28 are arranged in pairs, the eccentrics of each pair being at 180° to each other. One eccentric of each pair drives the crank end inlet valve and the other drives the head end inlet valve through independent eccentric straps 70.

Figure 12:
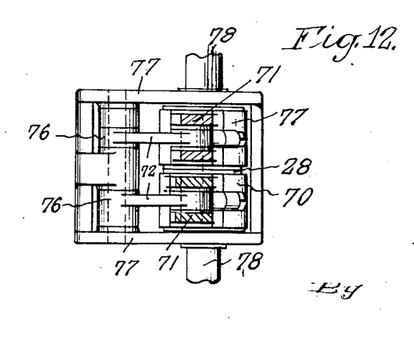
Fig. 12 is a fragmentary plan showing a portion of a quadrant with radius rods, eccentric straps, &c.

These straps 70 are of the type customarily used in Marshall valve gears and have a rod portion 71 guided by a radius bar 72. The rod portion 71 is bifurcated as shown in Fig. 2 and thus straddles the end of the corresponding radius bar 72 (see Fig. 12).

The crank end eccentric rod 71 is connected to its cam 65 by a single reach rod 73. The head end eccentric strap 70 is connected to its cam 65 by a two part reach rod consisting of two members 74, connected together, supported and guided by the arm 57 above described. The pivot connection to the eccentric rod 71 is shown at 75.

Aside from this slight difference in the construction of the reach rods, and the placing of their actuating eccentrics at 180° from each other the head end and crank end valve gears are identical and operate in the same way. The use of independent drives for the two valves is made necessary by the asymmetric operating characteristic of the particular modified Marshall valve gear chosen for illustration, for if a single gear of this modified type were connected in the conventional manner so as to operate both the head end and crank end inlets, one inlet valve must have excessive lead.

The radius bars 72 are pivoted at 76 to so-called quadrant yokes 77. There is one quadrant yoke 77 for each cylinder, each yoke supporting two radius bars 72, one for the crank end eccentric and the other for the head end eccentric (see Figs. 1, 2, 10 and 12). These quadrant yokes 77 are carried by a sectional reverse-shaft 78, the quadrant yokes with the reverse shaft elements forming a rigid unitary structure. This is angularly shiftable by the maneuvering motor which has a piston 79, working in a cylinder 80, and connected by piston rod 81 and lever 82 with the reverse shaft 78 (see Figs. 1, 2 and 11).

Figure 10:
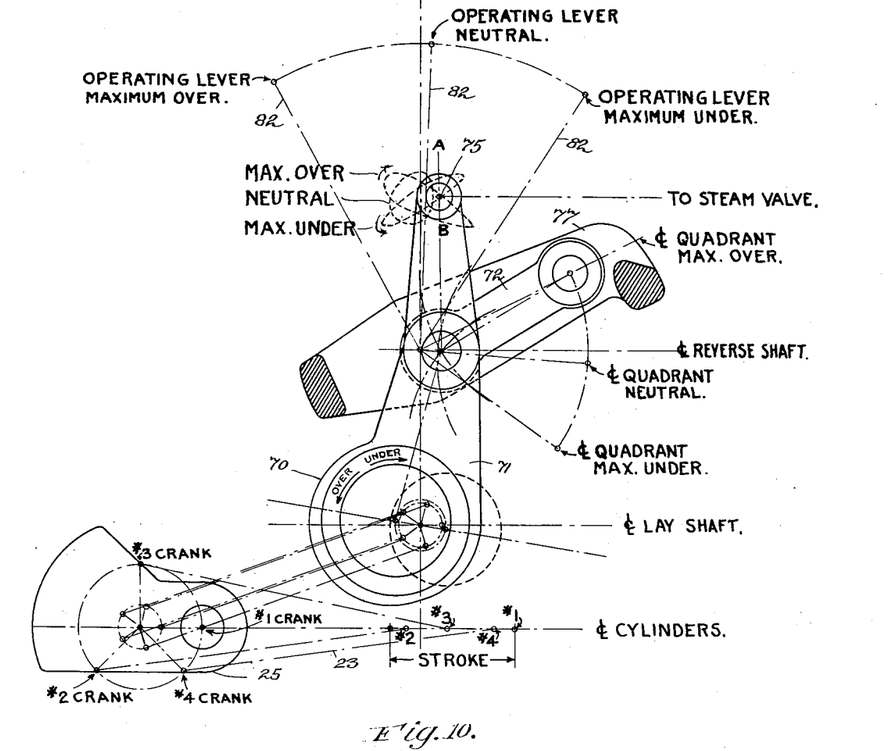
Fig. 10 is a detail view of one unit of the Marshall valve gear specially adapted to give variable lead, as herein explained with a diagram of the cranks and pistons and of the lay shaft and its driving connections. On this view is imposed a motion diagram showing the positions of the quadrant and the operating lever in the neutral and both maximum positions and the three resulting paths of the head of the eccentric rod.

The usual construction of Marshall valve gear is such that the effective length of radius bar 72 is equal to the radial distance from the axis of reverse shaft 78 to the axis of pivot support 76 on the quadrant. Under these conditions constant lead is secured. The variable lead desired to secure over travel of the inlet valve gear in valve closing direction can be had by using longer or shorter radius bars, the parts being appropriately arranged, but the use of shorter radius bars is illustrated. Fig. 10 is a diagram of crank and piston positions and of the two maximum and the neutral positions of the operating lever 82 and quadrant yokes 77. The path of the axis of pivot 75 is shown for all three positions and this last-named detail shows the variable lead characteristic and how the valve cams 65 must travel further and further in valve closing direction as the operating lever 70 moves from neutral toward its two maximum positions.

Since only that part of the motion to the right of line A—B is effective to open the inlet valves, it follows that in the neutral position the inlet valves do not open at all. Hence the engine must stop when the valve gear is set in neutral position and it is therefore possible to control the engine solely by the action of the cylinder 80 acting on the reversing valve gear.

Figure 11:
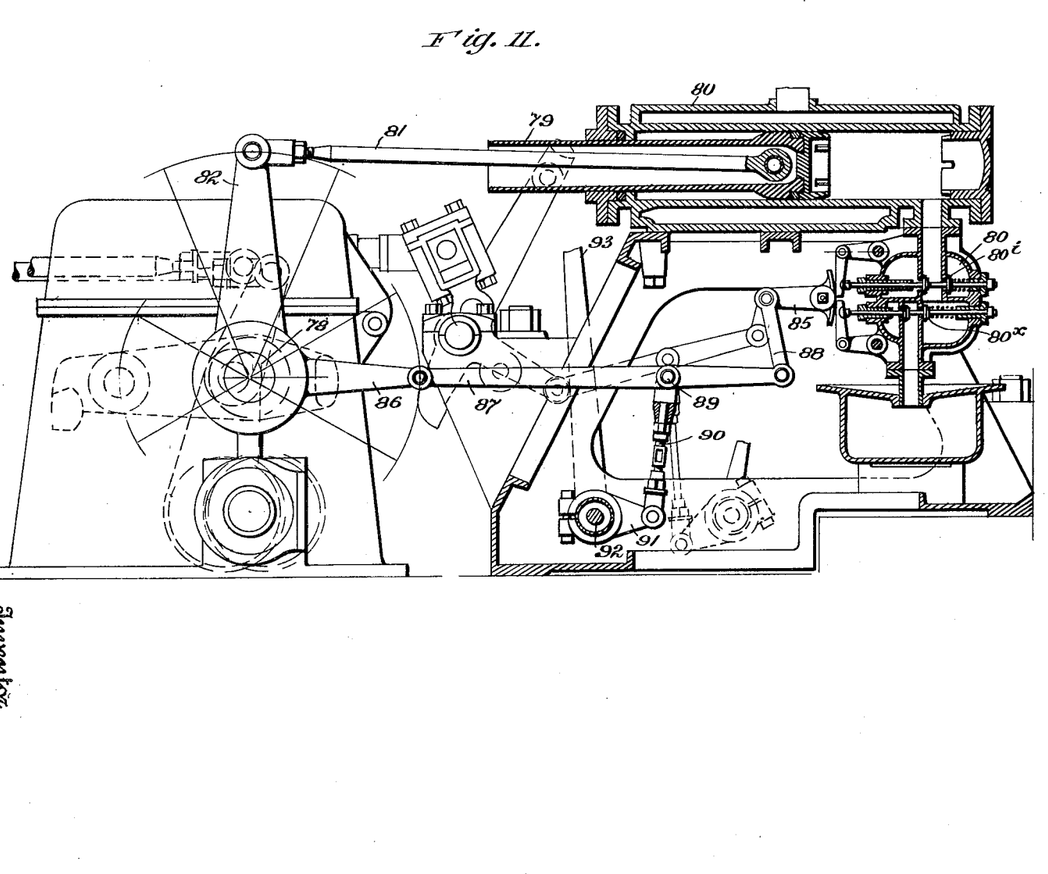
Fig. 11 is a sectional view showing the motor for maneuvering the quadrant shaft. This is the motor which controls the starting, stopping and reversing of the engine.

The actuating mechanism for the maneuvering shaft 78 is shown in Figs. 1, 2 and 11. The piston 79 which works in the cylinder 80 is of the differential type and is connected by the rod 81 with the arm 82 fast on the shaft 78, as already described. The left hand smaller face of the piston 79 is constantly subject to fluid pressure, usually hydraulic pressure. Pressure fluid is admitted to and discharged from the right hand larger face of the differential piston 79 by means of an enlarged inlet and discharge valve, indicated generally by the numeral 80 and having an inlet poppet valve $80^1$ and an exhaust poppet valve $80^x$ arranged to be unseated alternatively by a cam 85. An arm 86, fast on shaft 78 and so arranged as to be horizontal when the shaft 78 is in mid-gear position, as shown in Fig. 11, is connected by a floating lever 87 and link 88 with the actuating arm of the cam 85. The floating fulcrum 89 of lever 87 is guided by a link 90 pivoted to arm 91 on the valve gear maneuvering shaft 92. Maneuvering lever 93 is fast on the shaft 92 and is the means by which the entire engine is controlled under normal conditions. If the lever 93 be swung to the right, the arm 91 swings down, lowers the fulcrum 89 and thus results in swinging cam 85 counter-clockwise to open the exhaust valve $80^x$. This causes the piston 79 to move to the right, swinging the shaft 78 clockwise and causing the arm 86 to move downward. This lowers the left hand end of the lever 87, causing the right hand end to rise and restore the cam 85 to its normal position in which both the valves $80^1$ and $80^x$ are closed. If the lever 93 be moved to the left the inlet valve $80^1$ will be opened, the piston 79 will move to the left, the arm 86 will rise and restore the valve $80^1$ to its closed position. It follows that for every position of the lever 93 there is a corresponding position for the piston 79 and consequently for the shaft 78. Remembering that in mid-gear position of the shaft 78, which is the position shown in Fig. 11, all the steam inlet valves of the cylinder are closed, it will be observed that the engine may be stopped by setting the lever 93 in its mid position, and caused to operate in either of its two directions of rotation by moving the lever 93 in one or another direction from such mid position. To start the engine the lever 93 is moved in one or another direction to its limit of motion so as to shift the shaft 78 to one or another full gear position in which the unloading valves are operated. The valve gear is only retained in full gear position for a brief period and is thereafter moved to vary the cutoff according to the load.

In the event of maladjustment of some part of the valve gear a serious accident might occur if the entire reliance were placed on the inlet valve gear to stop the engine. Consequently as a secondary means and solely as a safety device a mechanism is provided which closes the main throttle valve when the inlet valve gear is in neutral position.

Figure 9:
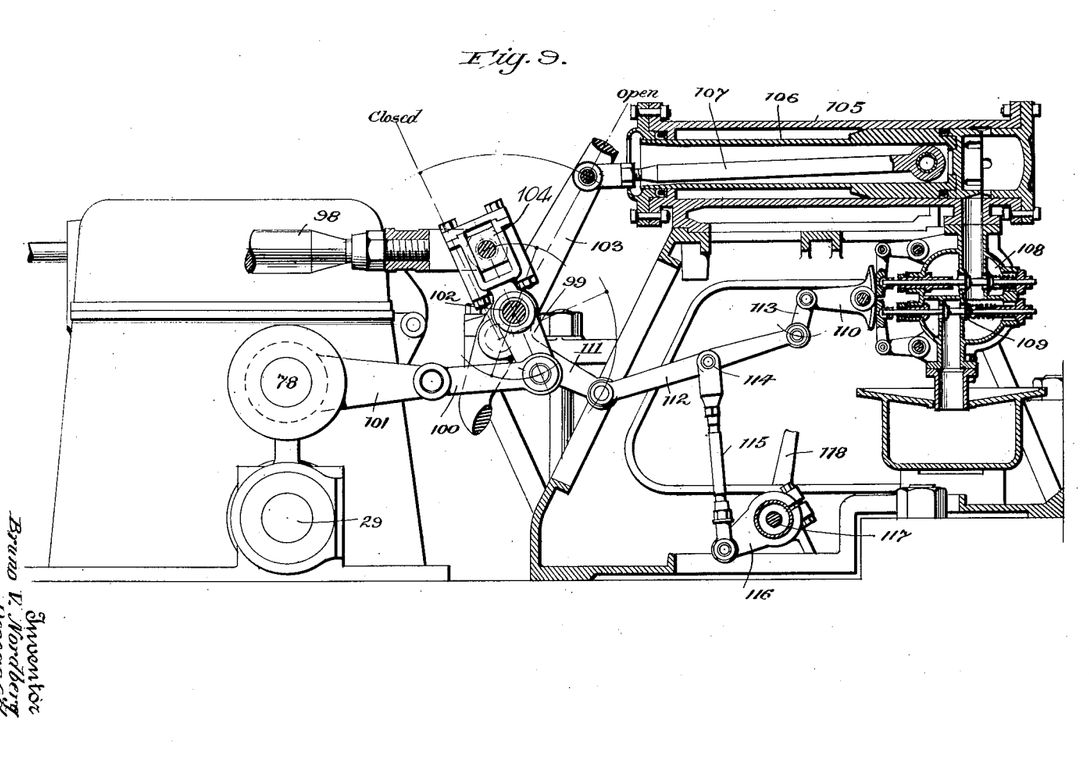
Fig. 9 is a sectional view showing the motor for actuating the main throttle valve and its relation to the reversing valve-gear. This view shows the floating linkage through which the throttle is closed as a precautionary measure in neutral position of the valve gear.
Figure 13:
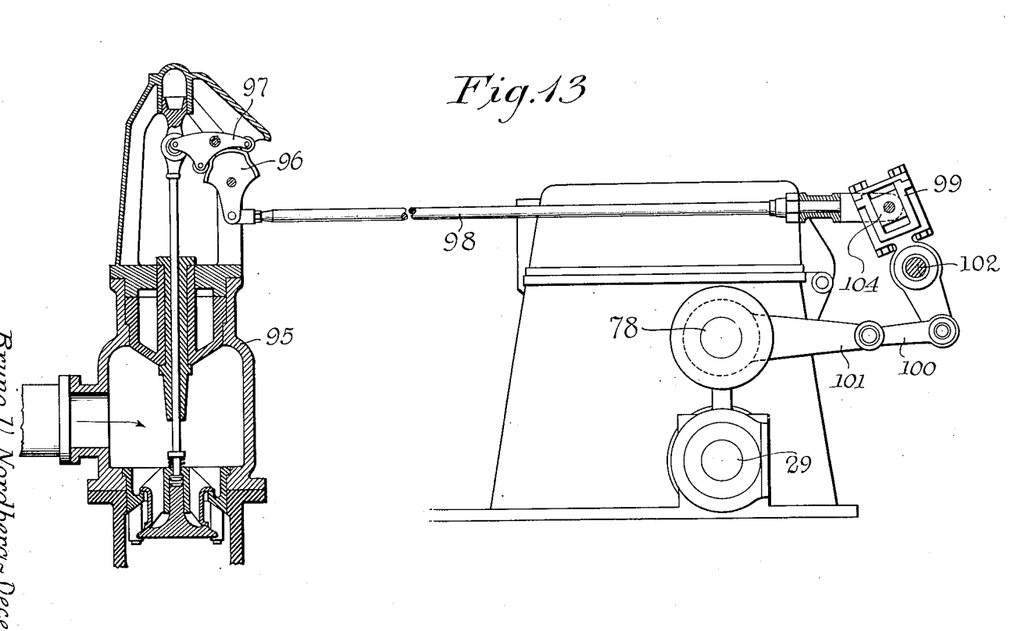
Fig. 13 is a fragmentary view showing the throttle valve and its actuating connections.

This mechanism is shown in Figs. 9 and 13 and may be readily understood from these figures considered in connection with Figs. 1 and 2. The main throttle valve is indicated generally at 95 (Fig. 13) and consists of a double beat poppet valve, larger than, but structurally identical with, the steam inlet valves for the cylinders, already described. The throttle valve is actuated by a cam 96 and cam follower 97, similar to the parts 61 and 65 already described. The follower 97 has two rollers through which the cam 96 imparts positive motion to the follower in both directions. The cam 96 turns in a clockwise direction to close the valve and after the valve has closed may over-travel while maintaining the valve closed. Similarly, the valve is opened by counter-clockwise motion of the cam 96 and the cam may over-travel after the valve is closed, maintaining said valve closed during the over-travel of the cam. The cam 96 is actuated by means of a reach rod 98 connected to the lower end of the cam 96, from which it follows that the throttle valve is closed by motion of the reach rod 98 to the left and opened by motion of the reach rod to the right.

The other end of the reach rod 98 is connected to the upper end of a floating lever 99 whose lower end is connected by link 100 with an arm 101 fast on the reverse shaft 78. The arm 101 is so positioned on the shaft 78 that when this shaft is in mid-gear position the arm 101 is substantially horizontal, as shown in Fig. 9. The floating lever 99 is pivoted near its mid-length on a journal 102 carried by the throttle actuating lever 103 a short distance above the fulcrum on which that lever turns. At its upper end the lever 99 is provided with a bearing block 104 which is adjustable, on occasion, in a radial direction in the lever 99 so as to determine the effective length of this lever above the journal 102. It will be understood that the arm 101 swings above or below the horizontal position shown in Fig. 9, according as the engine is running under or over.

The parts are dimensioned to meet the following requirements:

When the lever 101 is in the horizontal position shown in Fig. 9, the lever 99 is shifted in a counterclockwise direction so far that whether the lever 103 be in the open position shown in Fig. 9 or in its extreme left hand position, indicated by the legend "closed" on Fig. 9, the reach rod 98 will be so far to the left that the cam 96 holds the throttle valve 95 closed. This action is possible because of the characteristic of the cam 96 of permitting over-travel while holding the valve closed. However, if the lever 103 is in the open position shown in Fig. 9 and the arm 101 be swung up or down from its horizontal position, the reach rod 98 will be drawn to the right far enough to open the throttle 95. This means that when the arm 103 is in its open position of Fig. 9, the cam 96 is so positioned that slight motion of the rod 98 to the right will open the throttle valve 95.

It follows from the above that if the lever 103 be moved from the open position shown in Fig. 9, to the closed position indicated by the legend "Closed" on Fig. 9, the reach rod 98 will be moved so far to the left that no motion of arm 101 above or below its horizontal position can shift the reach rod 98 far enough to the right to open the throttle valve. The throttle actuating lever 103 is shifted to its closed position only to shut the engine down. During ordinary stoppages it remains in the open position of Fig. 9, but despite this fact the movement of the arm 101 to horizontal mid-gear position closes the throttle 95 independently of the action of the lever 103. This is merely a safety feature, because as already explained, when the arm 101 and the shaft 78 are in mid-gear position the inlet valve to the cylinders can not open in any position of the engine so that by the simple act of setting shaft 78 in mid-gear position the engine is stopped. The only purpose in closing the throttle 95 at such a time is to avoid a wreck in the event that the inlet valves should be improperly set and hence not function to stop the engine.

The throttle actuating lever 103 is shifted by a servo-motor essentially identical with that used to maneuver the reverse shaft 78. The cylinder of the servo-motor is shown at 105, the piston at 106, and the piston rod at 107. The rod 107 is connected directly to the lever 103. The piston is of the differential type, its smaller left hand face being constantly subject to fluid pressure, usually hydraulic pressure. The pressure acting on the larger right hand face of the differential piston is alternately admitted by an inlet valve 108 and discharged by an exhaust valve 109, which are actuated alternatively by a cam 110. The lever 103 carries an arm 111 to which is pivoted a floating lever 112. The other end of the floating lever 112 is connected by a link 113 to the valve actuating cam 110. The lever 112 has a floating fulcrum 114 supported by the upper end of link 115 whose lower end is fixed on the arm 116 fast on the throttle maneuvering shaft 117.

The shaft 117 may be shifted by hand lever 118 (see Fig. 9). If the lever 118 be moved to the right the link 115 moves the fulcrum 114 upward, rocks the cam 110 in a clockwise direction, opens the inlet valve 108 and admits additional fluid pressure against the right hand side of piston 106. Piston 106 then moves to the left, swings lever 103 in a counter-clockwise direction, and this causes arm 111 to swing upward, raising the left hand end of floating lever 112 and depressing the right hand end to restore cam 110 and cause valve 108 to close. Thus as the lever 118 is swung to the right, the piston 106 moves to the left, assuming a corresponding position for each position of the lever 118. Movement of the lever 118 to the left produces a similar result in the reverse sense, the cam 110 being rocked downward to open the discharge valve 109, the piston 106 moving to the right until, through the action of the arm 111, floating link 112 and cam 110, it restores the normal closed condition of the valve 109.

The operation of the various parts has been described in connection with the discussion above given, and no elaborate description of the operation of the engine is necessary. The important feature is that it is so designed that it will start at maximum cut off under full load, and that it is controlled both as to speed and direction of running and as to stopping exclusively by the valve gear. Obviously various changes can be made without departing from the inventive principle involved and therefore no limitation to the structure illustrated is implied except to the extent specified in the following claims.

What is claimed is:

1. A rolling mill engine comprising in combination a plurality of double-acting cylinders of the terminal exhaust type; reversing variable cut off inlet valve gear for said cylinders, said gear being of the variable travel link type and having insufficient travel in mid-gear position to open the inlet valves, and sufficient travel in other positions increasing toward both full gear positions; and unloading valves operable by said valve gear when the latter has the full travel produced in full gear positions.

2. A rolling mill engine comprising in combination a plurality of double-acting cylinders of the terminal exhaust type; reversing variable cut off inlet valve gear for said cylinders, said gear being of the variable travel link type and having insufficient travel in mid-gear position to open the inlet valves, and sufficient travel in other positions increasing toward both full gear positions; unloading valves operable by said valve gear when the latter has the full travel produced in full gear position; and automatic means serving to relieve said cylinders of pressure in excess of inlet steam pressure.

3. A rolling mill engine comprising in combination not less than three double-acting cylinders of the terminal exhaust type; reversing variable cut off inlet valve gear for said cylinders said gear being of the variable travel link type and having insufficient travel in mid-gear position to open the inlet valves, and sufficient travel in other positions to give variable cut off with and maximum cut off in both directions of running at about ⅝ stroke; and unloading valves operable by said valve gear at said maximum cut offs.

4. The combination with an engine having a cylinder of the terminal exhaust type and inlet valves, of a reversing valve gear said gear being of the variable travel link type and having increasing travel from mid gear toward both full gear positions, and being connected to actuate said inlet valves; and unloading valves operable by said valve gear when the latter has substantially its maximum travel.

5. The combination with an engine having a cylinder of the terminal exhaust type and inlet valves, of a reversing valve gear said gear being of the variable travel link type and having increasing travel from mid gear toward both full gear positions, and being connected to actuate said inlet valves; and unloading valves of the inward opening poppet type mounted in the path of a portion of said valve gear and in position to be engaged and forced open thereby when the valve gear has its maximum travel.

6. The combination with an engine having a cylinder of the terminal exhaust type and inlet valves, of a reversing valve gear said gear being of the variable travel link type and having increasing travel from mid-gear toward both full gear positions, and being connected to actuate said inlet valves; unloading valves arranged to be operated by said valve gear when the latter has substantially its maximum travel; and relief valves interposed between said cylinder and the steam supply and arranged to open automatically when cylinder pressure predominates.

7. The combination with an engine having a cylinder of the terminal exhaust type and individual steam inlet valves, of two Marshall type variable cut off reversing valve gears, one for each inlet valve, said gears each including an eccentric strap, radius bar and quadrant, the radius of the quadrant and the length of the bar being unequal, and the parts being so arranged as to afford a neutral mid-gear position in which both inlet valves are maintained closed.

8. The combination with an engine having a cylinder of the terminal exhaust type and individual steam inlet valves, of two Marshall type variable cut off reversing valve gears, one for each inlet valve, said gears each including an eccentric with strap, radius bar and quadrant, the radius of the quadrant and the length of the bar being unequal, and the parts being so arranged as to afford a neutral mid-gear position of minimum travel in which both inlet valves are maintained closed; and unloading valves for the two ends of the cylinder arranged to be opened by said valve gear through its increased travel when in full gear positions.

9. The combination with an engine having a cylinder of the terminal exhaust type and individual steam inlet valves, of two Marshall type variable cut off reversing valve gears, one for each inlet valve, said gears each including an eccentric with strap, radius bar and quadrant, the radius of the quadrant and the length of the bar being unequal, and the parts being so arranged as to afford a neutral mid-gear position of minimum travel in which both inlet valves are maintained closed; unloading valves for the two ends of the cylinder arranged to be opened by said valve gear through its increased travel when in full gear positions; and relief valves normally held closed by the pressure of steam supply interposed between the cylinder and steam supply.

10. The combination with an engine having a cylinder of the terminal exhaust type, individual steam inlet valves of the poppet type and individual actuating cams therefor, of two Marshall type variable cut off reversing valve gears each connected to actuate a corresponding cam, said gears each including an eccentric with strap, radius bar and quadrant, the radius of the quadrant and the length of the bar being unequal, and the parts being so arranged as to afford a neutral mid-gear position of minimum cam travel in which both inlet valves are maintained closed.

11. The combination with an engine having a cylinder of the terminal exhaust type, individual steam inlet valves of the poppet type and individual actuating cams therefor of two Marshall type variable cut off reversing valve gears each connected to actuate a corresponding cam, said gears each including an eccentric with strap, radius bar and quadrant, the radius of the quadrant and the length of the bar being unequal, and the parts being so arranged as to afford a neutral mid-gear position of minimum cam travel in which both inlet valves are maintained closed; and unloading valves for the two ends of the cylinder arranged to be actuated by said cams when the latter have their maximum travel occasioned by the placing of the valve gear in full gear positions.

12. The combination with an engine having a cylinder of the terminal exhaust type, individual steam inlet valves of the poppet type and individual actuating cams therefor of two Marshall type variable cut off reversing valve gears each connected to actuate a corresponding cam, said gears each including an eccentric with strap, radius bar and quadrant, the radius of the quadrant and the length of the bar being unequal, and the parts being so arranged as to afford a neutral mid-gear position of minimum cam travel in which both inlet valves are maintained closed; and inward opening poppet unloading valves for the two ends of the cylinder arranged to be actuated by said cams when the latter have their maximum travel occasioned by the placing of the valve gear in its full gear positions.

13. The combination of an engine including a cylinder and steam inlet valves therefor; a throttle valve controlling the flow of steam to said inlet valves; a variable cut off reversing inlet valve gear connected to actuate said inlet valves and having settings for forward and reverse running and an intermediate neutral position in which all said inlet valves are closed; and operative connections between said valve gear and said throttle valve for closing said throttle valve when said valve gear is in its neutral position.

14. The combination of an engine including a cylinder and steam inlet valves therefor; a throttle valve controlling the flow of steam to said inlet valves; a variable cut off reversing inlet valve gear connected to actuate said inlet valves and having settings for forward and reverse running and an intermediate neutral position in which all said inlet valves are closed; operative connections between said valve gear and said throttle valve for closing said throttle valve when said valve gear is in its neutral position; and independently operable means for closing said throttle valve regardless of the setting of the valve gear.

15. The combination of an engine including a cylinder and steam inlet valves therefor; a throttle valve controlling the flow of steam to said inlet valves; a variable cut off reversing inlet valve gear connected to actuate said inlet valves and having settings for forward and reverse running and an intermediate neutral position in which all said inlet valves are closed; a throttle valve actuator; and floating connections between said actuator, throttle valve and inlet valve gear.

16. The combination with an engine characterized by low inertia masses and having at least four double-acting cylinders and pistons therein, of a multiple throw crank shaft operatively connected with said pistons, the various throws of said crank shaft being so angularly spaced relatively to each other that the dead points for the different working spaces occur successively and are uniformly spaced throughout a revolution.

17. The combination with an engine having more than six working spaces and driving connections arranged to deliver the driving impulses of the individual spaces seriatim at uniform intervals; of valves controlling the admission to said working spaces; and a reversing valve gear of the link type arranged to give a variable cut-off in both directions of running and to have a mid-gear position in which said valves are closed.

18. The combination with a simple engine having more than three double-acting cylinders, and having cranks arranged to cause the individual working spaces to deliver their impulses seriatim at uniform intervals; of valves controlling the inlets to said working spaces; reversing valve gears of the link type, one for each inlet valve; and means for controlling all said gears simultaneously, said gears and controlling means being arranged to give variable cut-off in both directions of running with a mid-gear position in which said valves are closed.

19. The combination with a simple engine having more than three double-acting cylinders, and having cranks arranged to cause the individual working spaces to deliver their impulses seriatim at uniform intervals; of valves controlling the inlets to said working spaces; reversing valve gears of the link type, one for each inlet valve; means for controlling all said gears simultaneously, said gears and controlling means being arranged to give variable cut-off in both directions of running with excess travel in full-gear settings and with a mid-gear position in which said valves are closed; and unloading valves, one adjacent each inlet valve and each serving the same working space as the adjacent inlet valve, said unloading valves being arranged to be opened by over-travel of the inlet valve gear in a closing direction in full gear settings.

20. The combination with a simple engine having more than three double-acting cylinders of the terminal exhaust type, and having cranks arranged to cause the individual working spaces to deliver their impulses seriatim at uniform intervals; of valves controlling the inlets to said working spaces; reversing valve gears of the link type, one for each inlet valve; means for controlling all said gears simultaneously, said gears and controlling means being arranged to give variable cut-off in both directions of running with excess travel in full gear settings, and with a mid-gear position in which said valves are closed; and unloading valves, one adjacent each inlet valve and each serving the same working space as the adjacent inlet valve, said unloading valves being arranged to be opened by over-travel of the inlet valve gear in a closing direction in full gear settings.

21. The combination with a simple engine having more than three double-acting cylinders, and having cranks arranged to cause the individual working spaces to deliver their impulses seriatim at uniform intervals; of cam actuated inlet valve mechanisms controlling the inlets to said working spaces, the actuating cams of said valves being capable of over-travel after the valve is closed and after it has been opened; a reversing valve gear of the Marshall type including a swinging yoke and radius bars, the radius bars and yoke being of unequal radii; means for controlling all said yokes simultaneously to vary the cut-off when running in either direction; and unloading valves one adjacent each inlet valve and each serving the same working space as the adjacent inlet valve, said unloading valves being arranged to be opened by the over-travel of the inlet valve actuating cam beyond inlet valve closing position.

22. The combination with an inlet valve serving a working space, of a reversing valve gear of the link type capable of giving variable cut-off in both directions of running, and characterized by over-travel in valve-closing direction in full-gear settings; and an unloading valve adjacent the inlet valve, serving the same working space and arranged to be opened by the inlet valve gear when the same over-travels in full gear settings.

23. The combination of an inlet valve including a valve actuating cam capable of over-travel after the valve has opened and after the valve has closed; a working space fed by said valve; a reversing valve gear of the Marshall type including a yoke and a radius bar of unequal radii; and an unloading valve adjacent the inlet valve, serving the same working space and arranged to be opened by the inlet valve actuating cam when the same overtravels in inlet valve closing direction in full gear settings.

24. The combination of an inlet valve having an inlet steam passage leading thereto; a working space fed by said valve; of a reversing valve gear of the link type arranged to give variable cut-off in both directions of running, and characterized by over-travel in a valve closing direction in full gear settings; an unloading valve adjacent the inlet valve serving the same working space and arranged to be opened by the inlet valve gear when the same over-travels in full gear settings; and a relief valve controlling the passage between said working space and said inlet steam passage and normally held closed by preponderating inlet steam pressure.

25. The combination of an inlet valve including an inlet steam passage leading thereto and a valve actuating cam capable of over-travel after the valve has opened and after the valve has closed; a working space fed by said valve; a reversing valve gear of the Marshall type including a yoke and a radius bar of unequal radii; an unloading valve adjacent the inlet valve serving the same working space and arranged to be opened by the inlet valve actuating cam when said cam over-travels in inlet valve closing direction in full gear settings; and a relief valve controlling the passage between said working space and said inlet steam passage and normally held closed by preponderating steam pressure.

26. In an engine, the combination of a plurality of cylinder working spaces, exhaust valve means for said working spaces indifferent to the direction of rotation of the engine, an individual steam inlet valve for each working space; individual Marshall type variable cut-off reversing valve gears, one connected to operate each steam inlet valve, said gears each including an eccentric strap, radius bar and quadrant, the radius of the quadrant and the length of the bar being unequal and the parts being so arranged as to afford a neutral mid-gear position in which all inlet valves are maintained closed.

27. In an engine, the combination of a plurality of cylinder working spaces; exhaust valve means for said spaces indifferent to the direction of rotation of the engine; individual steam inlet valves of the poppet type for said working spaces; individual actuating cams for each inlet valve; Marshall type variable cut-off reversing valve gears, one connected to each of said individual actuating cams, said gears each including an eccentric with strap, radius bar and quadrant, the radius of the quadrant and the length of the bar being unequal and the parts being so arranged as to afford a neutral mid-gear position of minimum cam travel in which all inlet valves are maintained closed.

28. In an engine, the combination of a plurality of cylinder working spaces, exhaust valve means for said spaces indifferent to the direction of rotation of said engine; steam inlet valves, one for each said working space; and variable cut-off reversing valve gears of the link type, one for each inlet valve and each characterized by greater lead in mid-gear than in full gear positions.

29. In an engine, the combination of a plurality of cylinder working spaces; exhaust valve means for said spaces indifferent to the direction of rotation of the engine; steam inlet valves of the poppet type, one for each of said working spaces; actuating cams, one associated with each inlet valve to actuate the same; and variable cut-off reversing valve gears of the link type each operatively connected with a corresponding actuating cam and each characterized by a greater lead characteristic in mid-gear than in full gear positions.

30. In a rolling mill engine, the combination of a plurality of double-acting cylinders; exhaust valve means for said cylinders indifferent to the direction of rotation of the engine; reversing variable cut-off inlet valve gears for said cylinders, said valve gears being characterized by a different range of travel in mid-gear and in full gear positions; and unloading means for said cylinders rendered alternately operative and inoperative by said variable travel according as the gear is set in one or another position.

31. A reversible rolling mill engine comprising in combination, four double-acting cylinders; pistons therein; cranks to which said pistons are respectively connected, said cranks being spaced 90°, 45°, 90° and 135°; exhaust valve means indifferent to the direction of running; inlet valves for each end of each cylinder; and reversing variable cut-off valve mechanism controlling said inlet valves and having a maximum cut-off of the order of 60% and having a variable lead characteristic such that at substantially mid-gear position the inlet valves do not open.

32. A reversible rolling mill engine comprising in combination, four double-acting cylinders; pistons therein; cranks to which said pistons are respectively connected, said cranks being spaced 90°, 45°, 90° and 135°; exhaust valve means indifferent to the direction of running; inlet valves for each end of each cylinder; a reversing variable cut-off valve mechanism controlling said inlet valves and having a maximum cut-off of the order of 60% and having a variable lead characteristic such that at substantially mid-gear position the inlet valves do not open; a throttle valve; and connections between said valve gear and throttle to hold the latter closed when the former is in substantially mid-gear position.

33. A reversible rolling mill engine comprising in combination, four double-acting cylinders; pistons therein; cranks to which said pistons are respectively connected, said cranks being spaced 90°, 45°, 90° and 135°; exhaust valve means for each end of each cylinder; a reversing variable cut-off valve mechanism controlling said inlet valves and having a maximum cut-off of the order of 60% and having a variable lead characteristic such that at substantially mid-gear position the inlet valves do not open; a throttle valve; connections between said valve gear and throttle to hold the latter closed when the former is in substantially mid-gear position; and independent means for closing said throttle valve regardless of the setting of said valve gear.

34. A reversible rolling mill engine comprising in combination, four double-acting cylinders; pistons in said cylinders; cranks to which respective pistons are connected spaced successively 90°, 45°, 90° and 135°; exhaust valve means indifferent to the direction of rotation; inlet valves, one for each end of each cylinder; and a separate variable cut-off reversing valve gear for each inlet valve, all giving a maximum cut-off of the order of 60% and having a variable lead characteristic such that at substantially mid-gear position the inlet valves do not open.

35. A reversing rolling mill engine, comprising in combination, four double-acting cylinders; pistons in said cylinders; cranks spaced successively 90°, 45°, 90° and 135° to which said pistons are respectively connected; exhaust valve means indifferent to the direction of rotation; inlet valves, one for each end of each cylinder; an unloading valve associated with each inlet valve; and a separate variable cut-off reversing valve linkage for each inlet valve, each characterized by a maximum cut-off of the order of 60% and having variable travel and variable lead characteristics, such that with minimum travel substantially at mid-gear the inlet valves do not open and at maximum travel, substantially at full gear positions, the linkage engages and opens said unloading valves.

In testimony whereof I have signed my name to this specification.

HELENA C. NORDBERG,
*Executrix of the Estate of Bruno V. Nordberg.*